(12) United States Patent
Woodley, Jr.

(10) Patent No.: US 9,167,106 B1
(45) Date of Patent: Oct. 20, 2015

(54) SOLAR-POWERED CELL PHONE

(71) Applicant: Norman Woodley, Kansas City, MO (US)

(72) Inventor: Freddie Woodley, Jr., Gardena, CA (US)

( * ) Notice: Subject to any disclaimer, the term of this patent is extended or adjusted under 35 U.S.C. 154(b) by 85 days.

(21) Appl. No.: 14/017,526

(22) Filed: Sep. 4, 2013

(51) Int. Cl.
*H04B 1/38* (2015.01)
*H04M 19/08* (2006.01)

(52) U.S. Cl.
CPC ..................................... *H04M 19/08* (2013.01)

(58) Field of Classification Search
CPC .... H04M 19/08; H04B 1/3883; H04B 1/3833
USPC .................................. 455/573, 90.3
See application file for complete search history.

(56) References Cited

U.S. PATENT DOCUMENTS

| | | | |
|---|---|---|---|
| 5,898,932 A | 4/1999 | Zurlo et al. | |
| 6,339,311 B1 | 1/2002 | Caldwell | |
| 6,847,834 B1 * | 1/2005 | Leem | 455/572 |
| 6,977,479 B2 * | 12/2005 | Hsu | 320/101 |
| 7,072,696 B2 * | 7/2006 | Shaff | 455/572 |
| 7,251,509 B1 * | 7/2007 | Wang et al. | 455/574 |
| 7,667,433 B1 * | 2/2010 | Smith | 320/115 |
| 7,853,288 B2 | 12/2010 | Ma | |
| 7,923,963 B2 | 4/2011 | Sato | |
| 8,055,312 B2 * | 11/2011 | Shi | 455/573 |
| 8,116,827 B2 * | 2/2012 | Tseng | 455/573 |
| 8,384,541 B2 * | 2/2013 | Lee | 340/540 |
| 8,441,227 B2 * | 5/2013 | Choi et al. | 320/101 |
| 2003/0096642 A1 * | 5/2003 | Bessa et al. | 455/573 |
| 2006/0238163 A1 * | 10/2006 | Chen | 320/114 |
| 2007/0202833 A1 * | 8/2007 | Wang | 455/343.1 |
| 2010/0026233 A1 | 2/2010 | Lee et al. | |
| 2013/0084919 A1 * | 4/2013 | Glynn | 455/566 |

* cited by examiner

*Primary Examiner* — April G Gonzales

(57) ABSTRACT

The solar-powered cell phone is a cell phone wherein a back surface includes at least one solar cell thereon. The solar cell being in wired communication with a charge controller that is in turn in wired communication with an energy storage member and a light sensor. The energy storage member is in wired communication with an inverter that in turn supplies electricity to a cell phone CPU, cell phone display, and a SIM card. The solar cell(s) generate electricity when exposed to light, and the electricity generated is either stored on the energy storage member or is actively used via the cell phone.

3 Claims, 4 Drawing Sheets

ND CELL PHONE

SOLAR-POWERED CELL PHONE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of cell phones, more specifically, a solar powered cell phone.

SUMMARY OF THE INVENTION

An embodiment of the disclosure meets the needs presented above by generally comprising a cell phone wherein a back surface includes at least one solar cell thereon. The solar cell being in wired communication with a charge controller that is in turn in wired communication with an energy storage member and a light sensor. The energy storage member is in wired communication with an inverter that in turn supplies electricity to a cell phone CPU, cell phone display, and a SIM card. The solar cell(s) generate electricity when exposed to light, and the electricity generated is either stored on the energy storage member or is actively used via the cell phone.

These together with additional objects, features and advantages of the solar-powered cell phone will be readily apparent to those of ordinary skill in the art upon reading the following detailed description of presently preferred, but nonetheless illustrative, embodiments of the solar-powered cell phone when taken in conjunction with the accompanying drawings.

In this respect, before explaining the current embodiments of the solar-powered cell phone in detail, it is to be understood that the solar-powered cell phone is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar-powered cell phone.

It is therefore important that the claims be regarded as including such equivalent construction insofar as they do not depart from the spirit and scope of the solar-powered cell phone. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
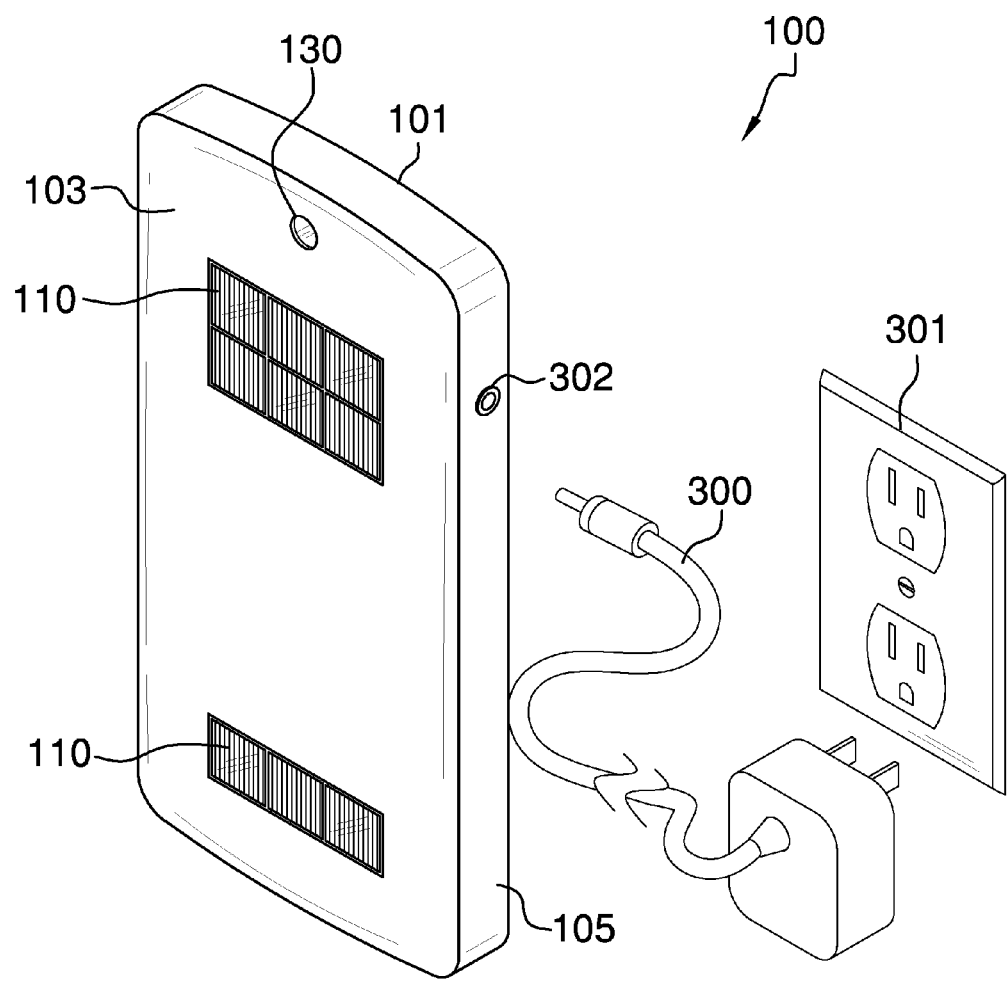
FIG. 1 is a rear, perspective view of the solar-powered cell phone.
Figure 2:
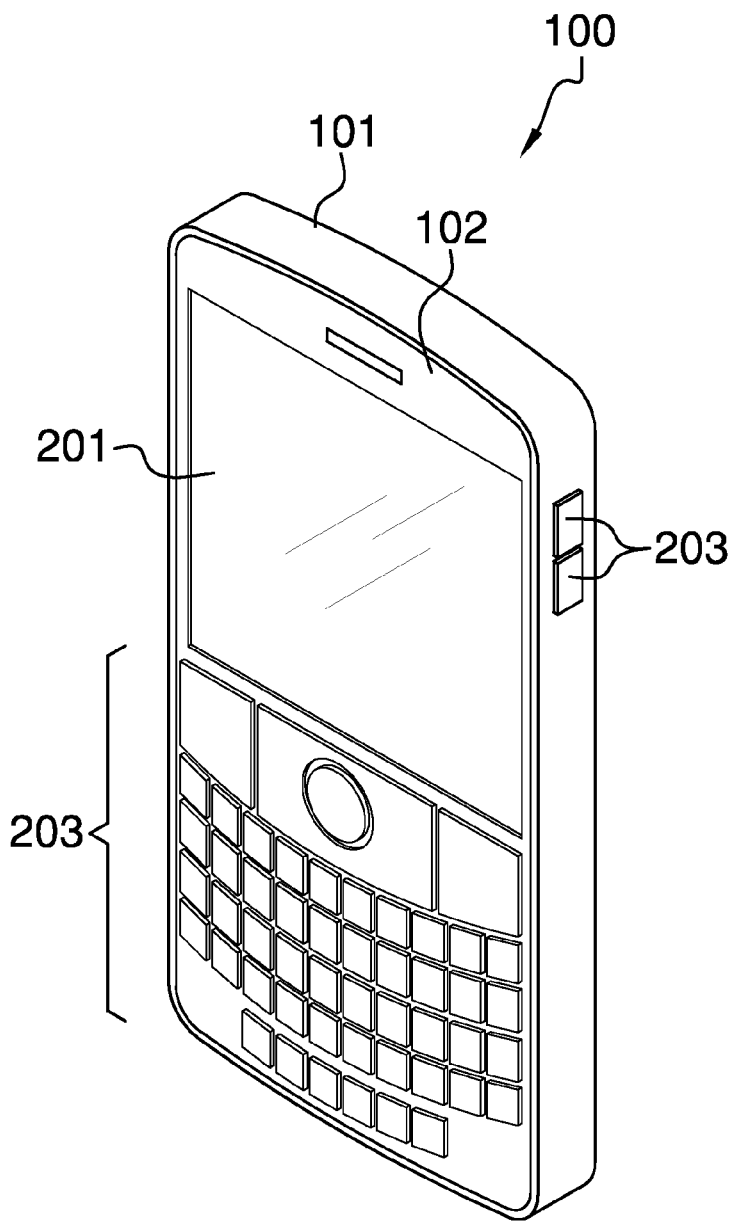
FIG. 2 is a front, perspective view of the solar-powered cell phone.
Figure 3:
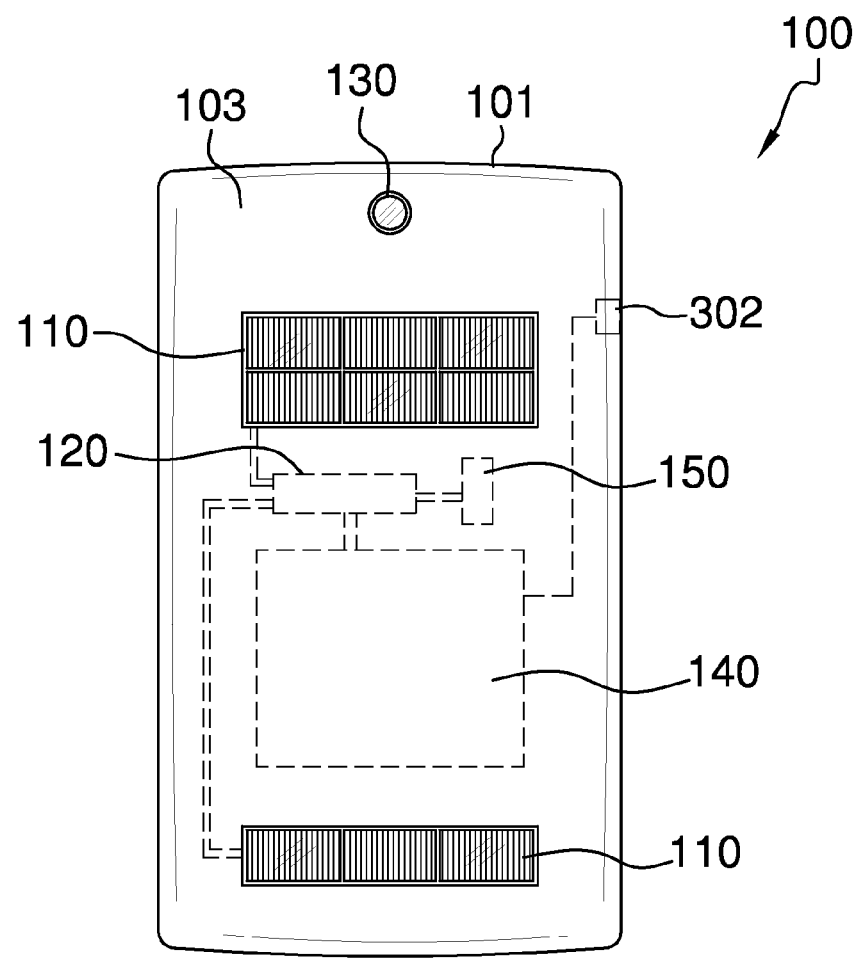
FIG. 3 is a rear view of the solar-powered cell phone.
Figure 4:
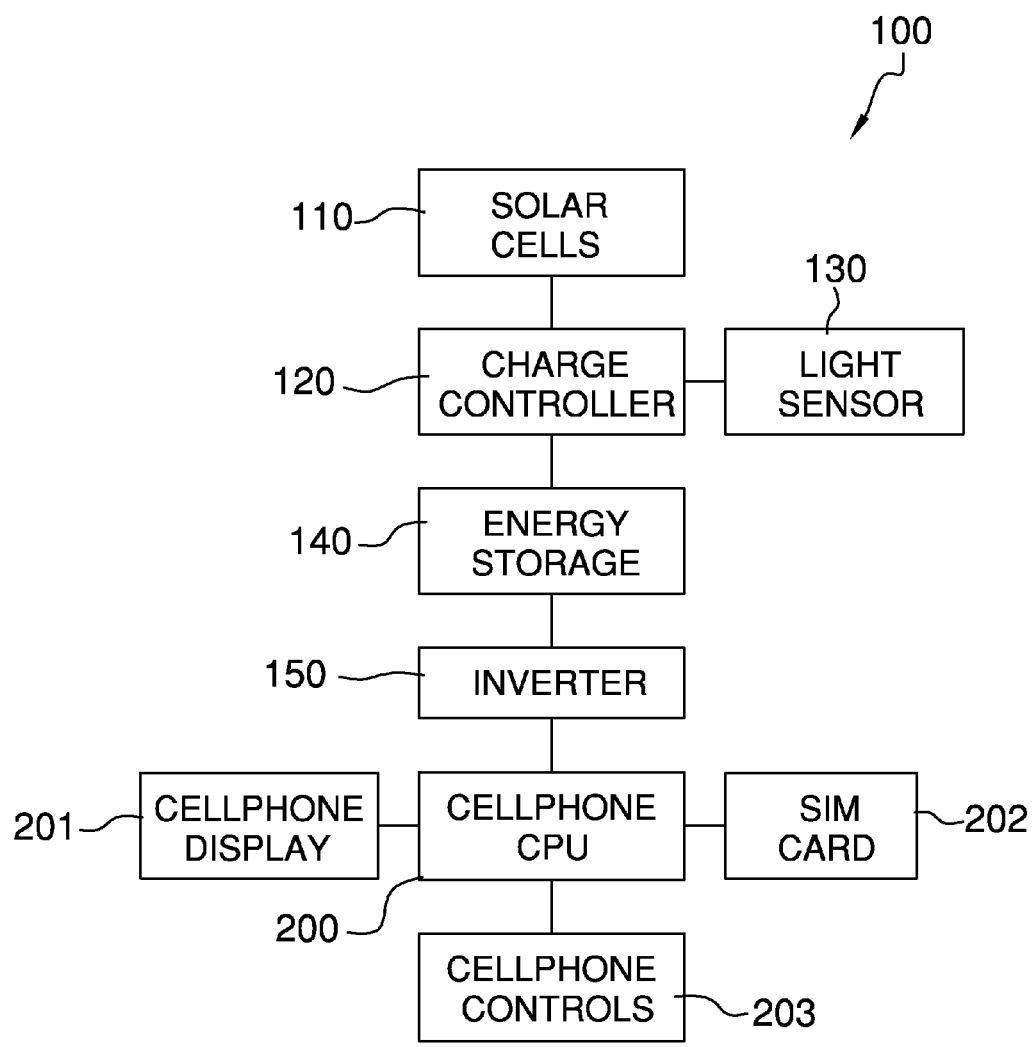
FIG. 4 is a block diagram of the components of the solar-powered cell phone.

As best illustrated in FIGS. 1 through 4, the solar-powered cell phone 100 (hereinafter invention) generally comprises a cell phone housing 101 that is further defined with a front surface 102 and a rear surface 103. The rear surface 103 of the housing 101 of the invention 100 includes at least one solar cell 110 thereon. The solar cell 110 is in wired communication with a charge controller unit 120. The charge controller unit 120 is in wired communication with a light sensor 130. Both the light sensor 130 and the solar cell(s) 120 are located on the rear surface 103 of the housing 101.

The light sensor 130 is included in order to determine if light is present to the solar cell(s) 110, and if so shall in turn signal the charge controller unit 120. The charge controller unit 120 is also in wired communication with an energy storage member 140. The energy storage member 140 is essentially a battery or batteries that store electricity generated via the solar cell(s) 110. The energy storage member 140 is in wired communication with an inverter 150 that transforms electricity from a DC current to an AC current. That being said, the inverter 150 is essentially an AC/DC converter.

The inverter 150 is in wired communication with a central processing unit 200 of the invention 100. The central processing unit 200 controls all functions associated with a cell phone, and includes a cell phone display 201, a SIM card 202, and cell phone controls 203.

The invention 100 is capable of producing electricity via the solar cell(s) 110 that is stored in the energy storage member 140 before being used in operation of the cell phone. The invention 100 may alternatively route the electricity produced via the solar cell(s) 110 to the central processing unit 200, and in which case the newly produced electricity is bypassing the energy storage member 140. The energy storage member 140 may be alternatively re-charged via an electrical cord 300 that plugs into a standard wall outlet 301. The electrical cord 300 plugs into a plug port 302 located on a side surface 105 of the housing 101.

It shall be noted that the light sensor 130 is being used to detect light in order to switch use of the energy storage member 140 over to the solar cells 110 directly. While the solar cells 110 re-charge the energy storage member 140, the solar cells 110 can be used to provide electricity to the central processing unit 200 directly.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A solar-powered cell phone comprising:
    a cell phone housing having at least one solar cell thereon, and in wired communication with a charge controller unit;
    said charge controller unit is in wired communication between the solar cell, a light sensor, and an energy storage member;
    electricity provided via the solar cell is transferred to the energy storage member that is in turn in wired communication with an inverter before said electricity is transmitted to a central processing unit;
    said central processing unit is in wired communication with a cell phone display, a cell phone controls, and a SIM card;
    wherein the cell phone housing is further defined with a front surface and a rear surface; wherein the rear surface of the housing includes the solar cell thereon;
    wherein the light sensor and the solar cell are located on the rear surface of the housing;
    wherein the light sensor determines if light is present to the solar cell, and if so shall in turn signal the charge controller unit, which in turn transmits electricity produced via the solar cell from the energy storage member to the central processing unit directly;
    wherein the solar cell is used to recharge the energy storage member and provide electricity to the central processing unit;
    wherein the inverter is an AC to DC converter, and transforms the electricity from the energy storage member from a DC current to an AC current before transmittal to the central processing unit.

2. The solar-powered cell phone according to claim 1 wherein the energy storage member is at least one battery that store electricity; wherein the energy storage member is alternatively re-charged via an electrical cord that plugs into a standard wall outlet; wherein the electrical cord plugs into a plug port located on a side surface of the housing.

3. A solar-powered cell phone comprising:
    a cell phone housing having at least one solar cell thereon, and in wired communication with a charge controller unit;
    said charge controller unit is in wired communication between the solar cell, a light sensor, and an energy storage member;
    electricity provided via the solar cell is transferred to the energy storage member that is in turn in wired communication with an inverter before said electricity is transmitted to a central processing unit;
    said central processing unit is in wired communication with a cell phone display, a cell phone controls, and a SIM card;
    wherein the cell phone housing is further defined with a front surface and a rear surface; wherein the rear surface of the housing includes the solar cell thereon;
    wherein the light sensor and the solar cell are located on the rear surface of the housing;
    wherein the light sensor determines if light is present to the solar cell, and if so shall in turn signal the charge controller unit, which in turn transmits electricity produced via the solar cell from the energy storage member to the central processing unit directly;
    wherein the solar cell is used to recharge the energy storage member and provide electricity to the central processing unit;
    wherein the inverter is an AC to DC converter, and transforms the electricity from the energy storage member from a DC current to an AC current before transmittal to the central processing unit;
    wherein the energy storage member is at least one battery that store electricity; wherein the energy storage member is alternatively re-charged via an electrical cord that plugs into a standard wall outlet; wherein the electrical cord plugs into a plug port located on a side surface of the housing.

\* \* \* \* \*